United States Patent [19]

Okamoto et al.

[11] Patent Number: 4,510,270

[45] Date of Patent: Apr. 9, 1985

[54] ANAEROBIC ADHESIVES HAVING EXCELLENT ADHESIVE PROPERTY AND PRESERVATIVE STABILITY

[75] Inventors: Takanori Okamoto; Hisakazu Mori; Hideaki Matsuda, all of Kagawa, Japan

[73] Assignee: Okura Kogyo Kabushiki Kaisha, Japan

[21] Appl. No.: 626,115

[22] Filed: Jun. 29, 1984

[30] Foreign Application Priority Data

Jul. 30, 1983 [JP] Japan ............................ 58-138730

[51] Int. Cl.$^3$ .................. C08K 3/32; C08L 33/06; C09J 1/00; C09J 3/14
[52] U.S. Cl. .................................. 523/176; 156/327; 156/332; 524/853; 526/233; 526/320
[58] Field of Search ............... 156/327, 332; 523/176; 524/853; 526/320, 233

[56] References Cited

U.S. PATENT DOCUMENTS

| | | | |
|---|---|---|---|
| 3,043,820 | 7/1962 | Krieble | 526/320 |
| 3,218,305 | 11/1965 | Krieble | 526/320 |
| 3,957,561 | 5/1976 | Skoultchi | 156/332 |
| 4,044,044 | 8/1977 | Saito | 526/230 |
| 4,410,644 | 10/1983 | Bunyan | 526/320 |
| 4,460,760 | 7/1984 | Okamoto et al. | 526/320 |

FOREIGN PATENT DOCUMENTS

58-154738  9/1983  Japan ............................ 523/176

*Primary Examiner*—Ronald W. Griffin
*Attorney, Agent, or Firm*—Jacobs & Jacobs

[57] ABSTRACT

By adding 0.001 to 0.1% by weight of a polyphosphoric acid to a one-part type anaerobic adhesive obtained by adding an organic peroxide, a hardening accelerator to an ordinary anaerobically polymerizable monomer, the adhesive property such as breakaway-torque on adhering screw portions, impact and shearing strength on adhering flat parts of metals and the preservative stability are greatly improved.

7 Claims, No Drawings

ANAEROBIC ADHESIVES HAVING EXCELLENT ADHESIVE PROPERTY AND PRESERVATIVE STABILITY

FIELD OF THE INVENTION

This invention relates to one-part type anaerobic adhesives having excellent adhesive property and preservative stability. More particularly, the invention relates to high-quality anaerobic adhesives which show excellent adhesive strength for the adhesion of screw portions or flat members with each other and can be preserved for a long period of time at room temperature without accompanies by the quality deterioration such as the viscosity increase, the gelation, and the reduction in adhering rate.

BACKGROUND OF THE INVENTION

Conventional anaerobic adhesives are prepared by adding an organic peroxide, a gelation stabilizer, etc., to a polyfunctional methacrylate as an anaerobically polymerizable monomer as described in, for example, U.S. Pat. No. 3,218,305; Japanese Patent Publication Nos. 6545/'68; 852/'69 and 7541/'69 and these adhesives are widely used for locking of screw portions, sealing of pipes, etc., in various industrial fields. However, these anaerobic adhesives composed of a polyfunctional methacrylate as the main component have a disadvantage that screw portions locked using these adhesives are liable to loose under severe conditions that vibrations or impacts are always applied to these portions due to the low breakaway torque strength and further these adhesives cannot be used for the adhesion of flat members with each other, such as the adhesion of a metal plate and a metal plate since the adhesive power of the adhesives for such plates is very weak.

On the other hand, by using a carboxy group-containing compound as an anaerobically polymerizable monomer, adhesives showing a relatively high breakaway torque strength for the adhesion of screw portions are obtained as described in, for example, Japanese Patent Publication Nos. 31,680/'71; 9460/'73 and 41,437/'77 and Japanese Patent Publication (Unexamined) No. 86,937/'73 but the adhesion of flat members with each other is scarcely improved by these adhesives. Also, the aforesaid adhesives have a disadvantage that the metals adhered using the adhesives are corroded by the action of the carboxy group of the adhesives as well as have large disadvantages in the points of heat resistance, water resistance and stimulation of human skins.

Furthermore, U.S. Pat. No. 4,044,044, Japanese Patent Publication No. 39,694/'77 and Japanese Patent Publication (Unexamined) Nos. 83,572/'82; 90,074/'82 and 83,075/'83 describe that anaerobic adhesives having excellent adhesive strength are obtained by adding polymerizable organic acid phosphates having specific structures to polyfunctional methacrylates. However, these polymerizable acid phosphates have a fault of reducing the adhering rate of the one-part type anaerobic adhesives. Also, a polymerizable acid phosphate is usually prepared by the reaction of phosphorus pentaoxide and a polymerizable organic compound but there are difficulties in the preparation of the phosphates since phosphorus pentaoxide is very liable to change the quality thereof by the moisture in the air during the reaction and the reaction severely occurs.

SUMMARY OF THE INVENTION

As the result of various investigations for eliminating the above-described disadvantages in the conventional techniques, the inventors have discovered that the adhesive strength of an anaerobic adhesive composed of an anaerobically polymerizable monomer, an organic peroxide, and a hardening accelerator is greatly improved by only adding a polyphosphoric acid, which is an inorganic phosphorus compound, to the adhesive. Polyphosphoric acid which is used in this invention is commercially available and is a linear phosphoric acid polymer shown by the general formula

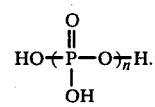

The polyphosphoric acid is a mixture of the above-described phosphoric acid polymers of the general formula, wherein n is usually 3 to 6. By using polyphosphoric acid according to this invention, the breakaway torque strength in screw portions is greatly improved and in the adhesion of flat members with each other, the impact strength and the shearing strength are also greatly improved and the broken surfaces of the adhered parts are cohesive failure. Also, as the result of detailed investigations on the addition amount of the polyphosphoric acid, it has been discovered that even by the addition of such a very small amount of the polyphosphoric acid as giving no bad influences on the adhering rate of the adhesion, a remarkable effect is obtained. Furthermore, it has also been discovered that the polyphosphoric acid gives a remarkable effect in preservative stability. Based on these discoveries, the present invention has been attained.

That is, according to this invention, there is provided a one-part type anaerobic adhesive which is obtained by adding an organic peroxide and a hardening accelerator to an anaerobically polymerizable monomer and does not harden in the presence of air but hardens by intercepting air, wherein a polyphosphoric acid is present in the anaerobic adhesive in an amount of at least 0.001% by weight, preferably 0.005 to 0.1% by weight to the total amount of the adhesive.

DESCRIPTION OF THE PREFERRED EMBODIMENT

The anaerobically polymerizable monomer in the anaerobic adhesive of this invention includes polyacrylates or polymethacrylates (hereinafter, are referred to as poly(meth)acrylates) of polyhydric alcohols, such as ethylene glycol di(meth)acrylate, tetraethylene glycol di(meth)acrylate, polyethylene glycol di(meth)acrylate, polypropylene glycol di(meth)acrylate, trimethylolpropane tri(meth)acrylate, glycerol di(meth)acrylate, etc.; mono(meth)acrylates such as diphenyl(meth)acryloyloxyethyl phosphate, dibutyl(meth)acryloyloxyethyl phosphate, dicyclopentenyl(meth)acrylate, methoxypolyethylene glycol(meth)acrylate, etc.; polyester(meth)acrylates; epoxy(meth)acrylates obtained by the addition reaction of epoxy compounds and (meth)acrylic acid; soluble elastomers containing a (meth)acryl group in the molecule; urethane poly(meth)acrylates; and compounds represented by general formula (I)

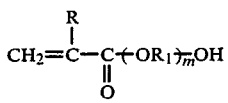

$$CH_2=C{-}C{+}OR_1{)}_m OH \quad (I)$$
$$\phantom{CH_2=C-}\overset{|}{R}\ \overset{\|}{O}$$

wherein R represents a hydrogen atom or a methyl group; $R_1$ represents an alkylene group having 2 to 4 carbon atoms or a halogenated alkyl group having 2 to 4 carbon atoms; and m represents an integer of 1 to 8.

Examples of the compound shown by general formula (I) are hydroxyethyl(meth)acrylate, hydroxypropyl(meth)acrylate, hydroxychloropropyl(meth)acrylate, polyethylene glycol mono(meth)acrylate, polypropylene glycol mono(meth)acrylate, etc.

In the particularly preferred system of this invention, the compound shown by general formula (I) exist in the amount of at least 10% by weight of the anaerobically polymerizable monomers.

The above-described anaerobically polymerizable monomer may be used together with tris(meth)acryloyloxyethyl isocyanurate, tris(meth)acryloylhexahydro-S-triazine, diallyl phthalate, phenylmaleimide, etc., for improving the heat resistance of the adhesion.

The hardening accelerator is used for mainly increasing the adhering rate of the adhesion in this invention and the following compounds are preferred as the hardening accelerator.

a. o-Benzoic sulfimide.

b. a compound selected from the group consisting of heterocyclic secondary amines, heterocyclic tertiary amines, aromatic tertiary amines, arylsulfonylhydrazide, and water or a mixture thereof.

c. Salts of o-benzoic sulfimide and the amines in aforesaid b.

The addition amount of the hardening accelerator is preferably 0.1 to 5% by weight for compounds a and b and 0.2 to 10% by weight for compounds c respectively to the anaerobically polymerizable monomer.

The heterocyclic secondary amines in b include 1,2,3,4-tetrahydroquinoline, 1,2,3,4-tetrahydroquinaldine, 6-methyl-1,2,3,4-tetrahydroquinoline, etc. The heterocyclic tertiary amines include quinoline, 6-methylquinoline, phenazine, quinoxaline, etc. The aromatic tertiary amines include N,N-dimethylaniline, N,N-diethylaniline, N,N-dimethyl-p-toluidine, N,N-dimethyl-α-naphthylamine, N,N-dimethyl-m-anisidine, etc. Furthermore, the arylsulfonylhydrazide includes benzenesulfonylhydrazide, toluenesulfonylhydrazide, etc.

The salts of c can be easily prepared by the method described in Japanese Patent Publication No. 47,266/'78 found by the same inventors. The method of the preparation of the salt c, for example, the salt of o-benzoic sulfimide and 1,2,3,4-tetrahydroquinoline, is shown in the reference example.

It is necessary in this invention that the polyphosphoric acid be present in the anaerobic adhesive of this invention in an amount of at least 0.001% by weight to the amount of said adhesive and a preferred addition amount of the polyphosphoric acid is 0.005 to 0.1% by weight. In this invention, a sufficient effect is obtained by the addition of such a very small amount of the polyphosphoric acid. Thus, the use of the polyphosphoric acid gives the large effects of imparting an excellent adhesive property to the anaerobic adhesive and further improving the preservative stability of the adhesive without giving any bad influences on the adhering rate. The preservative stability of the anaerobic adhesion differs according to the kinds of the anaerobically polymerizable monomer and the hardening accelerator but a remarkable preservative stability is obtained in the presence of polyphosphoric acid alone or with other stabilizer.

It has also been found that as the stabilizer used together with the polyphosphoric acid, a conventionally known radical polymerization inhibitor such as hydroquinone, benzoquinone, a phenolic compound, etc., gives no or less effect but oxalic acid, an amine salt of an organic acid, and a metal chelating agent is very effective in this invention.

In addition, when an inorganic phosphorus compound having a similar structure to polyphosphoric acid, such as phosphoric acid, pyrophosphoric acid, hypophosphorus acid, phosphorous acid, etc., is used for the anaerobic adhesive in place of polyphosphoric acid, the remarkable effect as in this invention cannot be obtained and polyphosphoric acid only can provide the specific effect of this invention.

The above-described components are the main components of the anaerobic adhesive of this invention. The adhesive of this invention may further contain, if necessary, suitable amounts of a coloring agent, a thickening agent, a thixotropic agent, a plasticizer, a photosensitizer, an antioxidant, etc.

As described above, this invention provides an anaerobic adhesive having excellent adhesive property and shelf life or preservative property, which largely contributes to the development of the industries of the field.

Then, the invention will further be explained by the following examples and comparison examples, in which all parts are by weight unless otherwise indicated.

In addition, the performance tests in the examples were performed as follows according to the test methods of JAI (Japan Adhesive Industry Association), ASTM and ISO (The International Organization for Standardization).

Set Time (JAI-6-1979)

An adhesive was coated on the thread of a bolt of M10, the bolt was screwed into a nut, they were allowed to stand at 23° C. without applying a torque, and the time required until the nut could not be moved by hand by the initiation of adhesion, which was defined as the set time.

Breakaway Torque Strength and Prevailing Torque Strength (JAI-6-1979)

The bolt nut assembly adhered as described above was further allowed to stand for 24 hours at 23° C. and then the breakaway torque strength and the prevailing torque strength were measured by means of a torque wrench. The breakaway torque strength was shown by the torque when the adhesion was first broken by the revolution and the prevailing torque strength was shown by the mean value of the torque at $\frac{1}{4}$, $\frac{1}{2}$, $\frac{3}{4}$, and 1 revolutions, respectively after the first breakage of the adhesion.

Preservative Stability (JAI-6-1979)

An adhesive was placed in a 100 milliliter polyethylene container in an amount of $\frac{1}{2}$ of the volume of the container, the container was allowed to stand in a hot-air oven of 50° C. while observing the occurrence of the viscosity increase or gelation of the adhesive in the container, and also about the adhesives showing no quality change for 10 days, the set time, the breakaway torque strength and the prevailing torque strength were measured. If no large quality change occurs under the above-described condition, the shelf life of the adhesive is over one year at room temperature.

Tensile Shear Strength (ASTM D 1002-64)

Two cold rolled steel plates each of 1.6 mm in thickness, which were polished with ç240 sand paper and degreased with trichlene, were adhered to each other and after allowing to stand for 24 hours at 23° C., the tensile shear strength was measured.

In the following measurements of the adhesion strength, the surface treatment of the materials to be adhered was performed as above.

Impact Strength (ASTM D950-54)

SS41 General structural rolled steels were adhered using an adhesive and after allowing to stand for 24 hours at 23° C., the impact strength was measured.

Compression Shear Strength (JAI-6-1979)

A bearing having an inside diameter of 9 mm was adhered to a steel shaft having the same diameter using an adhesive and after allowing to stand for 24 hours at 23° C., the compression shear strength was measured.

Peel Strength (IS 4578)

A cold rolled steel plate of 1.6 mm in thickness was adhered to a cold rolled steel plate of 0.6 mm in thickness using an adhesive and the peel strength was measured as the same manner as above.

REFERENCE EXAMPLE

One (1) ml of o-benzoic sulfimide was added into 1 liter of ethanol, and then 1.1 mols of 1,2,3,4-tetrahydroquinoline was slowly added thereto with stirring at room temperature. The stirring was continued, for 3 hours after the addition was completed, and then the reaction was allowed to stand at 5° C. for 5 hours. The salt of o-benzoic sulfimide and 1,2,3,4-tetrahydroquinoline was separated out as crystals. Ethanol and an excess amount of 1,2,3,4-tetrahydroquinoline were removed by filtration and the crystals were dried under reduced pressure. The resulting salt was prism like crystals easily soluble in water having an endthermic peak at 140.5° C. by a differential thermal analysis.

EXAMPLE 1 AND COMPARISON EXAMPLE 1

To 100 parts of the anaerobically polymerizable monomer composition shown in Table 1 were added 0.87 part of o-benzoic sulfimide and, as the case may be, an acryl polymer (Dianal BR75, made by Mitsubishi Rayon Co., Ltd.) as a thickening agent and a gelation stabilizer in the amounts shown in Table 1 and after heating the mixture to 80° C. for one hour to dissolve the components, the dissolved mixture was cooled to room temperature. Then, 0.63 part of 1,2,3,4-tetrahydroquinoline, 0.3 part of cumene hydroperoxide, and 2 parts of water were added to the solution followed by sufficiently stirring, polyphosphoric acid was added to the mixture in the amount shown in Table 1 to provide an adhesive. In addition, for the sake of comparison, adhesives having the same compositions as above without containing polyphosphoric acid only were prepared (comparison examples).

About each of the adhesives thus obtained, the preservative stability (days required for the gelation at 50° C.), the adhesive property for M10 iron bolt.nut, and the impact strength were measured, the results being shown in Table 1.

TABLE 1

| Sample No. | Composition | (part) | Example (A)*2 | Example (B)*3 | Example (C)*4 | Comparison Example*1 (A)*2 | Comparison Example*1 (B)*3 | Comparison Example*1 (C)*4 |
|---|---|---|---|---|---|---|---|---|
| 1 | Dimethacrylate of the addition product of bisphenol A and ethyleneoxide at 1:3 by mole ratio (BPE) | 50 | >10 | 373/387 | 7.2 | 1 | 235/380 | 1.6 |
|  | Hydroxypropyl methacrylate | 50 |  |  |  |  |  |  |
|  | Acryl polymer | 8 |  |  |  |  |  |  |
|  | Polyphosphoric acid | 0.005 |  |  |  |  |  |  |
| 2 | BPE | 50 | >10 | 390/424 | 8.7 | 1 | 235/380 | 1.6 |
|  | Hydroxypropyl methacrylate | 50 |  |  |  |  |  |  |
|  | Acryl polymer | 8 |  |  |  |  |  |  |
|  | Polyphosphoric acid | 0.01 |  |  |  |  |  |  |
| 3 | Polyester methacrylate*5 | 32 | >10 | 260/425 | 6.8 | 1 | 120/400 | 1.3 |
|  | BPE | 48 |  |  |  |  |  |  |
|  | Hydroxyethyl methacrylate | 20 |  |  |  |  |  |  |
|  | Polyphosphoric acid | 0.03 |  |  |  |  |  |  |
|  | Ethylenediamine salt of methacrylic acid | 0.005 |  |  |  |  |  |  |
| 4 | Tetraethylene glycol dimethacrylate | 40 | >10 | 447/277 | 7.8 | 1 | 263/253 | 1.2 |
|  | Hydroxypropyl methacrylate | 60 |  |  |  |  |  |  |
|  | Acryl polymer | 14 |  |  |  |  |  |  |
|  | Polyphosphoric acid | 0.01 |  |  |  |  |  |  |
| 5 | Trimethylolpropane trimethacrylate | 20 | >10 | 393/350 | 3.4 | 1 | 173/260 | 1.1 |
|  | Hydroxypropyl methacrylate | 80 |  |  |  |  |  |  |
|  | Acryl polymer | 14 |  |  |  |  |  |  |
|  | Polyphosphoric acid | 0.03 |  |  |  |  |  |  |
|  | Oxalic acid | 0.005 |  |  |  |  |  |  |
| 6 | Epoxy methacrylate*6 | 40 | >10 | 490/370 | 4.2 | 1 | 380/260 | 1.1 |
|  | Hydroxypropyl methacrylate | 60 |  |  |  |  |  |  |
|  | Acryl polymer | 2 |  |  |  |  |  |  |
|  | Polyphosphoric acid | 0.03 |  |  |  |  |  |  |
|  | Ethylenediamine salt of methacrylic acid | 0.005 |  |  |  |  |  |  |
| 7 | Terminal methacrylated product of liquid rubber*7 | 50 | >10 | 338/103 | 8.2 | 1 | 250/118 | 3.3 |
|  | Hydroxypropyl methacrylate | 50 |  |  |  |  |  |  |
|  | Polyphosphoric acid | 0.03 |  |  |  |  |  |  |
|  | Oxalic acid | 0.005 |  |  |  |  |  |  |

TABLE 1-continued

| Sample No. | Composition | (part) | Example (A)*2 | (B)*3 | (C)*4 | Comparison Example*1 (A)*2 | (B)*3 | (C)*4 |
|---|---|---|---|---|---|---|---|---|
| 8 | Hydroxyethyl methacrylate | 100 | >10 | 547/367 | 3.2 | 1 | 382/318 | 1.3 |
|  | Acryl polymer | 15 |  |  |  |  |  |  |
|  | Polyphosphoric acid | 0.03 |  |  |  |  |  |  |
|  | Ethylenediamine salt of methacrylic acid | 0.005 |  |  |  |  |  |  |

*1 The composition of the example, from which polyphosphoric acid was removed.
*2 Preservative stability (day)
*3 Breakaway torque/prevailing torque (kg-cm)
*4 Impact strength (kg-cm/cm$^2$)
*5 Polyesterificated product of ethylene glycol, phthalic anhydride, and glycidyl methacrylate at 1:2:2 by mole ratio
*6 Addition reaction product of bisphenol A diglycidyl ether and methacrylic acid at 1:2 by mole ratio
*7 Addition reaction product of hydroxy group-terminal polybutadiene, toluene diisocyanate, and hydroxyethyl methacrylate at 1:2:2 by mole ratio.

As is clear from the results shown in Table 1, the adhesive compositions containing polyphosphoric acid described in the example of this invention are greatly excellent in adhesive property and preservative property as compared to the compositions of the comparison example containing no polyphosphoric acid.

Then, about the compositions which could be stored stably without being gelled for 10 days at 50° C. shown in the example of this invention, the set times and the adhesive properties for M10 iron bolt.nut before deteriorating the compositions by heating them to 50° C. and after forcedly deteriorating them for 10 days at 50° C. were measured and the results thus obtained are shown in Table 2.

TABLE 2

| Sample No. | Before Deterioration Set time (min.) | Bt/Pt* (kg-cm) | After Deterioration Set time (min.) | Bt/Pt* (kg-cm) |
|---|---|---|---|---|
| 1 | 4 | 373/387 | 4 | 435/410 |
| 2 | 4 | 390/424 | 5 | 500/400 |
| 3 | 4 | 260/425 | 5 | 320/435 |
| 4 | 6 | 410/440 | 6 | 480/480 |
| 5 | 5 | 393/350 | 8 | 410/420 |
| 6 | 8 | 490/370 | 10 | 570/440 |
| 7 | 5 | 338/103 | 6 | 380/250 |
| 8 | 8 | 547/367 | 10 | 580/410 |

*Breakaway torque/prevailing torque

As is clear from the results shown in Table 2, the properties of the adhesive compositions of this invention is scarecely reduced and the adhesive strength is rather increased.

Furthermore, other plate-to-plate adhesive strengths than the impact strength were also measured about the adhesive composition of Sample No. 7 in Table 1 and the results are shown in Table 3.

TABLE 3

| Test Item | Example (Sample No. 7) | Comparison Example* |
|---|---|---|
| Tensile shear strength (kg/cm$^2$) | 160 | 113 |
| Peel strength (kg/25.4 mm) | 9.6 | 1.2 |
| Compressive shear strength (kg/cm$^2$) | 371 | 220 |

*Composition of Sample No. 7 from which polyphosphoric acid was removed.

As shown in the above table, the effect of the addition of polyphosphoric acid is clear.

Also, as to the adhesion breakaway faces, the polyphosphoric acid-containing system shows a complete cohesive failure including the case of impact strength, while the polyphosphoric acid-free system shown as interfacial failure.

EXAMPLE 2 AND COMPARISON EXAMPLE 2

To a mixture of 50 parts of urethane polymethacrylate obtained by the addition reaction of 2,4-toluene diisocyanate and hydroxypropyl methacrylate at 1:2 by mole ratio and 50 parts of hydroxypropyl methacrylate were added 0.03 part of polyphosphoric acid and various additives shown in Table 4 (together with the addition amounts) to provide anaerobic adhesives. About each of the adhesives thus obtained, the preservative stability (days required for causing gelation of the adhesive at 50° C.) and the adhesive property of the adhesive for M10 iron bolt.nut were measured and the results are shown in Table 4.

TABLE 4

| Sample No. | Additives | Amount (Part) | Example (A)*2 | (D)*3 | (C)*4 | Comparison Example*1 (A)*2 | (D)*3 | (C)*4 |
|---|---|---|---|---|---|---|---|---|
| 9 | o-Benzoic sulfimide | 0.5 | >10 | 5 | 480/415 | 1 | 6 | 285/365 |
|  | 1,2,3,4-Tetrahydroquinoline | 0.5 |  |  |  |  |  |  |
|  | Cumene hydroperoxide | 0.3 |  |  |  |  |  |  |
|  | Water | 2.0 |  |  |  |  |  |  |
|  | Ethylenediamine salt of methacrylic acid | 0.01 |  |  |  |  |  |  |
|  | Polyphosphoric acid | 0.03 |  |  |  |  |  |  |
| 10 | o-Benzoic sulfimide | 0.5 | >10 | 17 | 480/458 | >10 | 17 | 200/413 |
|  | 1,2,3,4-Tetrahydroquinoline | 0.5 |  |  |  |  |  |  |
|  | Cumene hydroperoxide | 0.3 |  |  |  |  |  |  |
|  | Ethylenediamine salt of methacrylic acid | 0.01 |  |  |  |  |  |  |
|  | Polyphosphoric acid | 0.03 |  |  |  |  |  |  |
| 11 | o-Benzoic sulfimide | 0.5 | >10 | 10 | 500/400 | >10 | 10 | 230/445 |
|  | N,N—Dimethyl-α-naphthylamine | 0.5 |  |  |  |  |  |  |
|  | Cumene hydroperoxide | 0.3 |  |  |  |  |  |  |
|  | Water | 2.0 |  |  |  |  |  |  |
|  | Ethylenediamine salt of methacrylic acid | 0.01 |  |  |  |  |  |  |
|  | Polyphosphoric acid | 0.03 |  |  |  |  |  |  |

TABLE 4-continued

| Sample No. | Additives | Amount (Part) | Example (A)*2 | Example (D)*3 | Example (C)*4 | Comparison Example*1 (A)*2 | Comparison Example*1 (D)*3 | Comparison Example*1 (C)*4 |
|---|---|---|---|---|---|---|---|---|
| 12 | o-Benzoic sulfimide | 0.87 | >10 | 20 | 370/215 | >10 | 20 | 130/113 |
|  | Cumene hydroperoxide | 0.3 |  |  |  |  |  |  |
|  | Water | 2.0 |  |  |  |  |  |  |
|  | Polyphosphoric acid | 0.03 |  |  |  |  |  |  |
| 13 | 1,2,3,4-Tetrahydroquinoline | 0.63 | >10 | 85 | 320/295 | >10 | 85 | 210/145 |
|  | Cumene hydroperoxide | 0.3 |  |  |  |  |  |  |
|  | Water | 2.0 |  |  |  |  |  |  |
|  | Polyphosphoric acid | 0.03 |  |  |  |  |  |  |
| 14 | o-Benzoic sulfimide | 0.92 | >10 | 22 | 370/398 | >10 | 22 | 180/215 |
|  | Quinoxaline | 0.65 |  |  |  |  |  |  |
|  | Cumene hydroperoxide | 0.3 |  |  |  |  |  |  |
|  | Water | 2.0 |  |  |  |  |  |  |
|  | Polyphosphoric acid | 0.03 |  |  |  |  |  |  |
| 15 | o-Benzoic sulfimide | 1.0 | >10 | 4 | 430/413 | 1 | 4 | 100/210 |
|  | Benzenesulfonyl hydrazide | 1.0 |  |  |  |  |  |  |
|  | Cumene hydroperoxide | 0.3 |  |  |  |  |  |  |
|  | Water | 2.0 |  |  |  |  |  |  |
|  | Polyphosphoric acid | 0.03 |  |  |  |  |  |  |
| 16 | 1,2,3,4-Tetrahydroquinoline salt of o-benzoic sulfimide | 1.5 | >10 | 4 | 440/445 | 1 | 6 | 140/438 |
|  | Cumene hydroperoxide | 0.3 |  |  |  |  |  |  |
|  | Water | 2.0 |  |  |  |  |  |  |
|  | Oxalic acid | 0.005 |  |  |  |  |  |  |
|  | Polyphosphoric acid | 0.03 |  |  |  |  |  |  |

*1 The composition of the example, from which polyphosphoric acid was removed.
*2 Preservative stability (day)
*3 Set time (minute)
*4 Breakaway torque/prevailing torque (kg-cm)

Also, about the adhesive composition Sample No. 9 in Table 4, the adhesive property thereof for M10 bolts.-nuts composed of various materials was measured and the results are shown in Table 5. In addition, for comparison, the same measurement was performed on the comparison system having the same composition as Sample No. 9 excluding, however, polyphosphoric acid and the results are also shown in Table 5.

TABLE 5

| Kind of bolt.nut | Example (D)*2 | Example (B)*3 | Comparison Example*1 (D)*2 | Comparison Example*1 (B)*3 |
|---|---|---|---|---|
| Stainless steel | 16 | 325/355 | 14 | 180/270 |
| Aluminum | 7 | 235/broken | 6 | 20/230 |
| Brass | 2 | 95/280 | 2 | 30/285 |
| Parkerizing | 4 | 415/390 | 4 | 245/305 |
| Nickel plating | 11 | 315/300 | 10 | 200/240 |
| Chromium plating | 35 | 260/285 | 25 | 155/450 |
| Zinc plating | 12 | 300/380 | 19 | 240/290 |
| Unichrome*4 | 16 | 290/310 | 17 | 137/313 |

*1 Composition of the example from which polyphosphoric acid was removed.
*2 Set time (Min.)
*3 Breakaway torque/prevailing torque (kg-cm)
*4 Trade name of United Chromium Inc. in U.S.A.

As is clear from the results shown in Table 4 and Table 5, the adhesive strength is greatly improved by the addition of polyphosphoric acid.

What is claimed is:

1. A one-part type anaerobic adhesive, which comprises an organic peroxide, a hardening accelerator, an anaerobically polymerizable monomer which does not harden in the presence of air but hardens in the absence of air, and polyphosphoric acid in an amount of at least 0.001% by weight based on the total amount of the anaerobic adhesive.

2. The one-part type anaerobic adhesive as claimed in claim 1, wherein the proportion of polyphosphoric acid is 0.001 to 0.1% by weight based on the total amount of the anaerobic adhesive.

3. The one-part type anaerobic adhesive as claimed in claim 1, wherein the anaerobically polymerizable monomer contains at least 10% by weight of a compound represented by general formula (I)

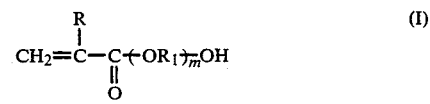

wherein R represents hydrogen or methyl; $R_1$ represents alkylene having 2 to 4 carbon atoms or halogenated alkylene having 2 to 4 carbon atoms; and m is an integer of 1 to 8.

4. The one-part type anaerobic adhesive as claimed in claim 1, wherein the hardening accelerator is
(a) 0.1 to 5% by weight of o-benzoic sulfimide,
(b) 0.1 to 5% by weight of a compound selected from the group consisting of a heterocyclic secondary amine, a heterocyclic tertiary amine, an aromatic tertiary amine, an arylsulfonyl hydrazide, and water, or a mixture thereof, or
(c) 0.2 to 10% by weight of a salt of o-benzoic sulfimide and the amine in (b) described above.

5. The one-part type anaerobic adhesive as claimed in claim 1, wherein said adhesive further contains at least one of oxalic acid, an amine salt of an organic acid, and a metal chelating agent.

6. The one-part type anaerobic adhesive as claimed in claim 1, wherein said polyphosphoric acid is a linear phosphoric acid polymer of the formula

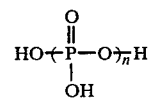

wherein n is 3 to 6.

7. The one-part type anaerobic adhesive as claimed in claim 6, wherein said polyphosphoric acid is present in an amount of from 0.005 to 0.1% by weight, based on the total amount of the anaerobic adhesive.

* * * * *